United States Patent [19]
Perret, Jr.

[11] Patent Number: 5,617,377
[45] Date of Patent: Apr. 1, 1997

[54] WATCHBAND CONNECTOR PIN UTILIZING SHAPE MEMORY MATERIAL

[76] Inventor: Gerard A. Perret, Jr., 16014 Penwood Dr., Tampa, Fla. 33647

[21] Appl. No.: 571,595

[22] Filed: Dec. 13, 1995

[51] Int. Cl.⁶ .............................. A44C 5/00; G04B 37/00
[52] U.S. Cl. .............................................. 368/282; 24/168
[58] Field of Search ................................... 368/281, 282; 224/168–180

[56] References Cited

U.S. PATENT DOCUMENTS

| | | | |
|---|---|---|---|
| 3,818,552 | 6/1974 | Droz | 24/265 B |
| 4,135,358 | 1/1979 | Ricca | 368/281 |
| 5,129,753 | 7/1992 | Wesley et al. | 403/322 |
| 5,233,884 | 8/1993 | Rochte | 74/581 |
| 5,310,376 | 5/1994 | Mayuzumi et al. | 466/107 |
| 5,363,351 | 11/1994 | Carney | 368/282 |
| 5,366,254 | 11/1994 | Tucchio et al. | 285/23 |
| 5,416,953 | 5/1995 | Hui | 24/265 |

OTHER PUBLICATIONS

Operating Instructions, "Eddie Bauer" Convertible Watch.

*Primary Examiner*—Bernard Roskoski
*Attorney, Agent, or Firm*—Dominik & Stein

[57] ABSTRACT

A device and system for releasably securing a watchband to a watch casing. Specifically, a watchband connector pin is formed of a shape memory material, preferably a shape memory alloy. The watchband may be readily released and reattached from a watch casing to facilitate repairs of the watch, for aesthetic considerations, or when the watch band is damaged or worn. The connector pin is durable due to the one piece design, easy to operate, flexible, and economical to produce.

10 Claims, 2 Drawing Sheets

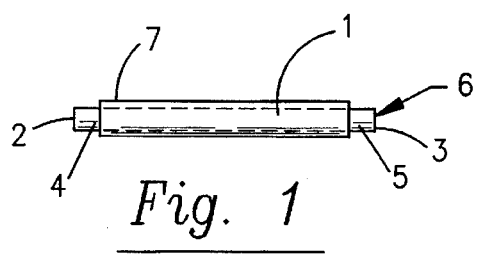
Fig. 1
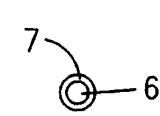
Fig. 2
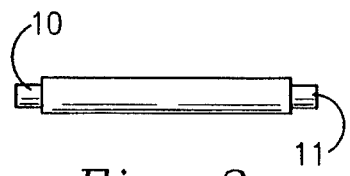
Fig. 3
Fig. 4
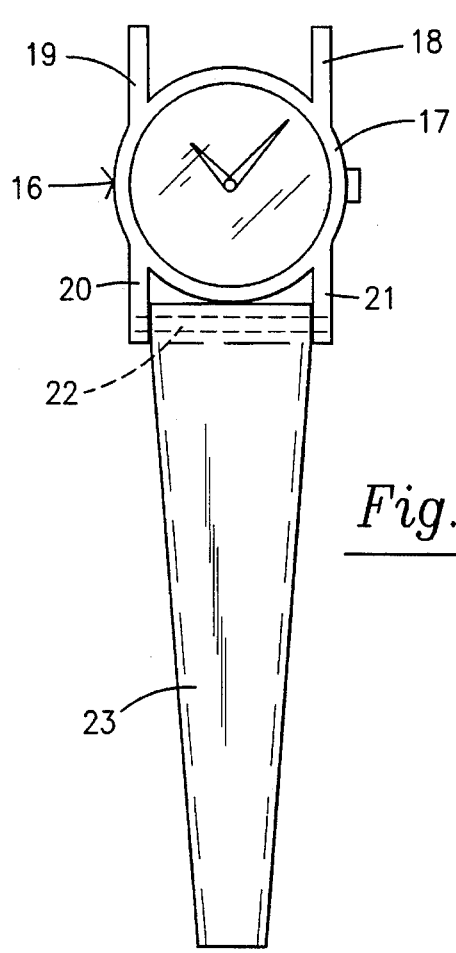
Fig. 5
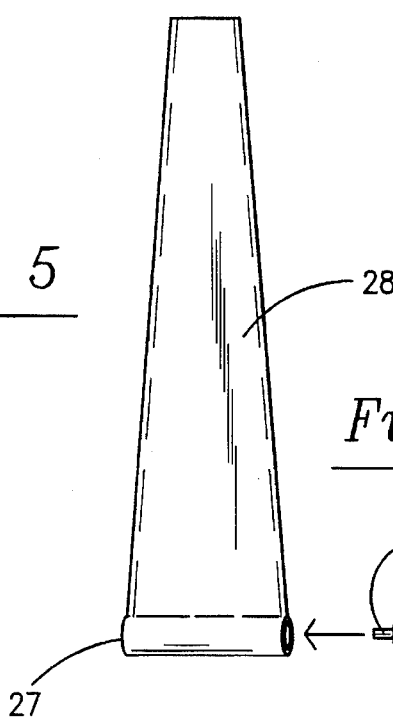
Fig. 6
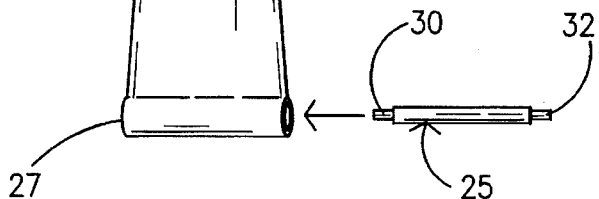

WATCHBAND CONNECTOR PIN UTILIZING SHAPE MEMORY MATERIAL

BACKGROUND OF THE INVENTION

1. Field of the Invention

The present invention concerns a device and system for releasably securing a watchband to a watch casing, and in particular, to a watchband connector pin formed of a shape memory material, preferably a shape memory metal alloy. The connector pin is durable due to the one piece design, economical to produce, and easy to operate.

2. Description of the Related Art

Wrist watches with replaceable bands have been known for more than half a century. The wrist watch requires replacement or exchange of wristbands for numerous reasons, most often when the band becomes worn or damaged. Modern wristwatches utilize a variety of mechanisms for attaching the watchband, that portion which encircles the wrist of tile wearer, to the watch casing. Most prevalent is the spring pin. A spring pin generally comprises an elongate metal cylinder, a spring means enclosed within the cylinder, and slide pins projecting from the ends of the cylinder and adapted to being urged outward from said cylinder by said spring and into receptacles formed in the watch casing.

The term "watch casing", as used herein, refers to that portion of the wrist watch assembly which surrounds the face of the watch and which houses the mechanical movement of the watch. Traditionally, the watch casing is provided with a receiving means, located on opposing ends of the watch face, whereby the watchband may be attached to the case.

There are numerous watch designs for both the watch case and the watchband. The most traditional designs include a generally circular or rectangular watch case having two somewhat rectangular, elongated watchband straps, the watchband straps generally being attached to opposing sides of the watch case (usually adjacent to the numeral "12" and "6" respectively of the watch face). Each watchband strap is attached to the watch casing via a pair of strap support arms which are generally formed integrally with, and projecting from, the watch case. A pair of support arms project from each side of the watch casing and the arms of a pair are spaced a distance apart corresponding approximately to the width of the watchband strap at the point of attachment. Located on the inside surface of each paired support arm, (i.e., the side facing the mate) is a small aperture or indentation sized to receive one end of a spring-loaded pin. The two ends of the pin engage the two respective apertures, such that the pin is supported between the pair of support arms. The watchband strap is usually provided with a sleeve through which the pin can be inserted prior to installing the pin on the watch casing.

The pin is either inserted through the extended arms and held in place by screw means, or the pin is spring-biased between the extended arm members. In some embodiments, the pin may be journalled between the extended arm members. In instances where the pin is removable, the watchband is removed by either unscrewing the pin from between the arm members or by compressing the spring-biased pin to release it from between the arms. The pin, which is positioned within a sleeve formed in the watchband, may be removed from the sleeve and reinserted in another wristband for attachment of the new band to the casing.

Current watchband connecting means have an inherent problem in that it is rather tricky to remove the band from the watch. A specialized hand tool or instrument is generally required to remove the spring-loaded pin and thereby the watchband strap from the watch casing and to subsequently reattach the same or a replacement strap.

The current practice for removing the watchband and subsequently replacing the strap or band is rather tedious. For example, an individual desiring to replace or change a watch band must first fit a specially adapted tool into the space where the band abuts the watch case. While holding the watch assembly stationary in one hand, the individual must with the other hand assert sufficient pressure, in the correct direction, to release the spring pin holding the band in place. Then, once the spring pin is released, removed from the band to be replaced, and inserted into the new band, the process must be repeated in reverse. The individual must align one end of the spring pin in the "receiving aperture" while utilizing the specialized watch tool to depress the pin inward and aligning the second end of the pin into the opposing hole in the watch casing.

This approach presupposes several things. First, it presupposes that an individual may own or be willing to purchase the specialized tool necessary to release the hinge or spring pin. Second, it presupposes that the individual has sufficient hand strength and dexterity to hold the watch assembly stationary while exerting directional pressure with the opposing hand. In most, if not all, instances an individual wanting to replace or change the watchband on their watch will be required to frequent a jewelry or watch repair store thereby rendering a what should be a relatively simply and inexpensive procedure costly and time consuming.

There is thus a need for a device by means of which a watchband may be readily and rapidly replaced as desired for aesthetic consideration, to facilitate repairs to the watch, or when the band is damaged or worn.

There has also recently been an increase in worldwide watch manufacture and competitiveness, and watch prices have dropped drastically. Watches can be purchased for a few dollars. One significant cost in watch manufacturing is the pin which connects the band to the case. There is thus a need for a more economical means for securing a watch band to a watch casing than the conventional approach which requires the multi-component spring pin. In the manufacturing context, cost considerations and ease of assembly are crucial, and current methods of attaching watch band straps to the watch casing are costly, inefficient, and inconvenient due to the complexity of pin assemblies on the market.

Further, there has also been a trend to market to fashion conscious consumers as a package a single watch casing with a number of interchangeable watch bands. The provision of a number of watch bands of various colors and designs facilitates the initial sale to the consumer, since the consumer is likely to find at least one of the offered watch bands to be desirable. Also, it is known that children and adolescents often participate in fads and trends, including use of neon and other bright colors to accentuate their clothing, and will want to change a watch band to match their current outfit. There is thus a need for a device which is simple enough to allow even children, without undue adult supervision, to readily change-out the watchbands on their wrist watches.

Attempts have been made to provide a system or device which will facilitate the replacement of watchbands or watch straps. For instance, U.S. Pat. No. 5,416,953 (Wah-Sang Hui) teaches the use of a link or eye on the strap which may be interlinked with a link or eye on the wrist watch, one of the links including a spring loaded catch to allow interlinkage.

However, the link assembly used to attach the wrist strap is mechanically quite complex and has several drawbacks. The link includes a fixed cylinder, a piston moveable along the cylinder, a compression coil spring located within the cylinder and a handle for use in retracting the piston into the cylinder against the action of the spring so as to open the link. Further, use of the attachment means taught by Hui requires that the replacement straps be specially manufactured to join the disclosed link assembly. Finally, due to the exposed handles, the linkage means is readily visible (not flush) with the watch casing.

For the foregoing reasons, there is a need for an easy, inconspicuous and economical device to allow for replacement of a watchband for aesthetic purposes, to facilitate repairs, and replacement when the current watchband is damaged or worn.

SUMMARY OF THE INVENTION

In view of the foregoing disadvantages inherent in the current devices with which watchbands are attached to watch casings, it is the object of the present invention to provide an economical, efficient, and simple-to-use device by means of which a watchband may be readily released from and subsequently reattached to the watch casing.

It is a further object to provide a means for connecting a watchband to a watch casing which is both readily detachable and hinged in a conventional manner to allow flexibility of the watchband to conform to the movement of the wearer.

It is a further object to provide a means for releasably attaching a watchband to a watch casing while maintaining o significant band-to-case attachment strength and comfort to the wearer.

It is a further object to provide an attachment device which generally resembles the shape and outward appearance of a conventional spring pin, easily conforms to conventional watch casing dimensions, and will be readily adopted in the market as a substitute for the conventional spring-loaded pins.

After extensive investigation and experimentation, the present inventor has found that these and other objects are accomplished by providing a connector pin in a watch assembly which is comprised of a single piece of flexible and resilient material, which can be easily released by bending the pin so as to bring the ends closer together, which combines strength and durability, and which is characterized by easy release of the connector pin from the watch casing without requirement for any specialized tool.

A significant feature of the present invention resides in the use of a flexible and resilient material, preferably a shape memory material, preferably a metal alloy which returns to its original shape after being deformed, to construct the connector pin for hinging the watch band to the watch casing in the watch assembly.

The foregoing has outlined rather broadly the more pertinent and important features of the present invention in order that the detail description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other watch band attachment pins for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

Further objectives and advantages of the present invention will become apparent from a careful reading of the detailed description provided hereinbelow, with appropriate reference to the accompanying drawings.

Fig 1 is a cross-sectional view of a first embodiment of a connector pin with a secondary casing;

FIG. 2 is an end view of the connector pin shown in FIG. 1;

FIG. 3 is a cross-sectional view of a second embodiment of a connector pin formed with two thicknesses of shape memory material, preferably a metal alloy;

FIG. 4 is a cross-sectional view of a third embodiment of a connector pin formed from a uniform thickness of shape memory material, preferably a metal alloy;

FIG. 5 represents a plan view of a wrist watch assembly illustrating a particular embodiment of the present invention;

FIG. 6 is a plan view of a watchband strap, prior to inserting of the connector pin into the end of the strap proximal to the watch casing;

FIG. 9 is a back view of a metal watchband with a connector pin inserted through;

DETAILED DESCRIPTION OF THE INVENTION

Figure 7:
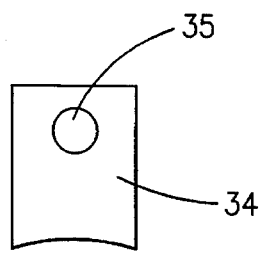
FIG. 7 is a side view of the watch of FIG. 5 showing a support arm with an aperture formed therein.

After extensive investigation, the present inventor has discovered that a wristband may be readily and releasably connected to a wrist watch by replacing the conventional mechanical spring connector pin with a connector pin which is manufactured from a single piece of shape memory material, preferably a slender rod of a metal referred to as a shape memory alloy. The connector pin may be solid throughout or it may be tubular. The connector pin is especially useful for rapidly and easily changing a watchband for repairs, for aesthetic purposes, or when a watchband becomes damaged or worn.

Since the watch pin according to the invention is essentially comprised of a single piece of metal, the structural integrity is higher than with a conventional spring pin, the chance of bending or breaking of components which is a problem with the conventional spring pin is eliminated, and the cost of manufacturing is substantially lower.

In a preferred embodiment of the invention the connector pin is formed from a segment of shape memory material, preferably a metal alloy wire. Shape memory materials are unique in that once formed, they may be manipulated and flexed, yet will retain or "remember" and readily revert to their original shape. For example, beryllium nickel copper alloys as used for guitar strings have good shape retentive properties.

The present invention is based upon the discovery that the conventional spring-activated pin can be replaced by a single memory connector pin for the hinge assembly. The hinge assembly utilizes the unique material properties of shape memory material, preferably a metal alloy as a means to releasably attach the watchband straps to the watch casing.

The shape memory connector pin is preferably fabricated from one of the nickel and titanium shape memory alloys, such as NITINOL or TINOL. Such a nickel titanium alloy, when formed into wire, is flexible yet returns to the original shape. wherein said shape memory alloy has a shape memory effect which allows the alloy to return from a deformed shape to a preset shape after being heated above a transition temperature, the transition temperature being the temperature at which the shape memory alloy transforms from a martensitic state into a austenitic state. U.S. Patent No. 5,233,884 (Rochte) teaches alternative alloys having shape memory effects. Additionally, beryllium nickel copper alloys have good shape retentive properties. The following Table shows other alloys having shape memory effects.

TABLE

| Alloy | Composition |
| --- | --- |
| AgCd | 44–49 at % Cd |
| AuCd | 46.5–50 at % Cd |
| CuAlNi | 14–14.5 wt % Al |
|  | 3–4.5 wt %/Ni |
| CuSn | ~15 at % 5n |
| CuZn | 38.5–41.5 wt % Zn |
| CuZn X |  few wt % X |
| (X = Si, Sn, Al) |  |
| InTi | 18–23 at % Ti |
| NiAl | 36–38 at % Al |
| NiTi | 49–51 at % Ni |
| FePt | ~25 at % Pt |
| MnCu | 5–35 at % Cu |
| FeMnSi | 32 wt % Mn, 6 wt % Si |

The above Table is derived from the publication "Using Shape Memory Alloys" by Darol E. Hodgson, Ph.D., 1988.

Inherent in such wire is the property that longer lengths of material are easily bent, while shorter lengths of the same diameter are more difficult to bend. Likewise, for a given length of wire, it is easier to bend the wire along the entire length to form an arc than it is to bend the wire at only one or the other end. Hence, for any given length of shape memory alloy the easiest point to bend it is at the midpoint, the most difficult at the distal ends. A force distributed along a segment of the wire will require more force for larger segments, less force for shorter segments.

Taking advantage of the above properties, a small diameter wire connector pin will suffice to hold a watch band in a watch case in the conventional configuration, since the pull of a watch band is exerted along nearly the entire length thereof, i.e., where bending is most difficult. A few tens of pounds of force may be exerted in a longitudinal direction against the pin along this length without any effective bending or elasticity being evident, thereby creating a functionally rigid connection under normal conditions of wear. On the other hand, when it is desired to remove the watch band, this can be simply accomplished by focusing pressure against the center of the pin, deforming the entire pin into a "U" shape, thereby bringing the ends of the pin closer together. When the ends of the pin are closer together, they can not span the entire distance between the pair of support arms, and the pin is thus easily removed from the watch case.

The connector pin of the present invention is light-weight, capable of sustaining high load conditions, and is highly reliable in that there are no moveable parts to wear out, deform, or break.

In a specific embodiment of the invention, the connector pin is provided with a sleeve casing. This sleeve casing serves to provide a second diameter for the connector pin and thereby also serves as a stop, once the connector pin is oriented in the receiving means, to maintain the pin in a fixed position. The sleeve is preferably a rigid durable plastic, but may be Teflon, a synthetic resin, metal, or any natural or artificial substance of sufficient durability for the intended purpose.

In the case that the sleeve is plastic, any conventional method may be employed for providing the plastic sleeve. It is well-known in the art of plastics to coat wire or cable by extrusion processes. Examples include pressure tooling where the melt is applied to the wire inside the die under whatever pressure exists after the wire exits the guide tip. Alternatively, in tubing tooling a melt is applied as the wire exits the die. Examples of a casing materials include rubber, polyethylene, polypropylene, nylon, fluropolymers, PVC or mixtures thereof.

The wire may also be encased in a tubular heat shrink plastic material. A heat tubular shrink plastic material is a material which, when heated, stretched, and cooled while stretched, forms secondary hydrogen bonds which retain the tube in the stretched shape. Once the tube is inserted over wire and heated, the secondary hydrogen bonds break and the tube reverts to the shape and size dictated by the primary chemical bonds. Using this heat shrink phenomena, wire is simply inserted into expanded heat shrink tubing, and the tubing is heated to tightly encase the wire.

The sleeve material can be neutral, transparent, or manufactured in a bright color. In the case of using various colors, different colors could be used to encode different sizes/ strengths of connector pins for facilitating selection and sorting. Further, loose connector pins of small size and can be readily misplaced or lost, and bright coloring may make misplaced pins easier to find.

A further design of connector pin according to the invention involves the provision of tapered, stepped ends to reduce the end diameter to the pins, and rounding or beveling to make the end faces of the pins less likely to scratch or mar the support arms or watch casing.

In accordance with the present invention, the connector pin can easily be formed to accommodate differing widths of watchband straps. For example, a thicker wire diameter and/or sleeve may be utilized to ensure a snug fit between the connector pin and the watch case or between the connector pin and the watch band. Since thicker wires are more difficult to bend that are particularly suited for wider watchbands and watches. Additionally, connector pins of differing length can readily be manufactured. An advantage of ease of inexpensively forming a variety of the widths and lengths of connector pins is that different styles of wrist watches can be easily accommodated, so that the memory material connector pin can be used to connect virtually any type watch band to any type watch case.

The use of the connector pin will now be explained in greater detail.

For installation, the connector pin formed of a shape memory material, preferably a metal alloy, is inserted through an opening defined in the end of a watchband strap which will abut the watch casing, hereafter referred to as the proximal end. The first end of the connector pin is inserted into a first opposing aperture or receptacle formed in the watch casing support arm. Unidirectional radial pressure is then exerted upon the center of the connector pin, causing the connector to flex and form an arc, reducing the distance between the connector pin ends and facilitating the insertion of the second end of the connector pin into the second aperture in the watch casing.

To remove the watchband strap the wearer or repair person simply applies sufficient pressure to the center of the connector pin causing the connector pin to flex and arc, bringing the connector pin ends closer together and disengaging the pin from the watch casing. The connector pin, since manufactured from a memory shape material, preferably a metal alloy, will return to its original linear configuration and can be readily reused.

The device according to the present invention will now be discussed in greater detail by reference to the drawings.

FIG. 1 illustrates a cross-sectional view of the connector pin 1 having a first end 2 and a second end 3. At each end is formed an insertion head, 4 and 5 respectfully, sized for insertion into the watch case. Encasing the connector pin is a sleeve casing 7 which provides a greater diameter than the connector pin wire 6 itself, thereby serving as a "stop" to help ensure the connector pin stays in place once inserted into the watch casing. FIG. 2 illustrates possible relative diameters of the connector pin wire 6 and sleeve casing 7.

FIG. 3 illustrates an alternative embodiment of the connector pin. Instead of the utilizing a separate sleeve casing to provide a diameter broader than the insertion head, the connector pin is constructed as a single unit from a shape memory material, preferably a metal alloy, having step reduced end portions, 10 and 11 respectively, adapted to enter into and be retained in apertures or receptacles provided in opposing end portions of a watch casing. This embodiment is ideally suited for larger watches with heavier watchbands or where there is a need to resist greater forces, such as with sports watches. Generally, the thicker the shape memory material, the greater the pressure necessary to deform the connector pin to releasably attach. Of course, stiffness will also vary depending upon the particular shape memory material.

FIG. 4 illustrates an additional embodiment of the connector pin suitable for use with, for example, rigid or metal watchbands. The connector pin is comprised of a single piece of uniform thickness shape memory material 15.

FIG. 5 represents a plan view of a wrist watch assembly illustrating a particular embodiment of the present invention. The wrist watch assembly 16 consists of a watch casing 17 with aligned opposing support arms 18, 19, 20, 21 formed integrally with the watch casing. As illustrated in FIG. 6, the connector pin 25 is inserted through an opening 27 defined in the proximal end of the watchband strap 28. Thereafter, the first insertion head 30 is inserted into an aperture or depression 35 (FIG. 7) defined in the inside of the support arm 34. The connector pin is next depressed to form an arc to bring the connector pin ends closer together and to thereby facilitate the insertion of the second insertion head 32 into an aligned aperture. Once the connector pin is inserted into the watch casing (FIG. 5), the watchband 23 is supported by the connector pin 25 (not shown) between the aligned support arms 20 and 21. Preferably, the watchband 23 abuts the support arms 20 and 21 thereby conceals the connector pin 22.

Figure 8:
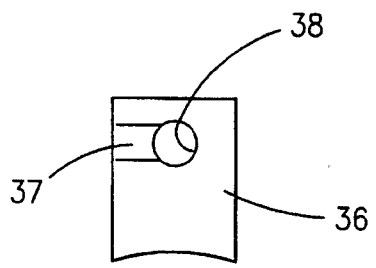
FIG. 8 is a side view of the watch of FIG. 5 showing an alternative embodiment of the support arm utilizing a guide groove and aperture.

FIG. 8 illustrates a further refinement to the support arm. The support arm 36 may be constructed with a guide indentation 37 located adjacent to the pin aperture 38. The guide indentation 37 aids in inserting the connector pin into the pin aperature. Specifically, when inserting the connector pin into the opposing apertures formed in the watch casing, the guide indentation facilitates placement of the connector pin by directing the first and second ends of the connector pin into place. The guide indentation is preferably directed towards the wrist, perpendicular to the angle of extension of the watch band.

Figure 9:
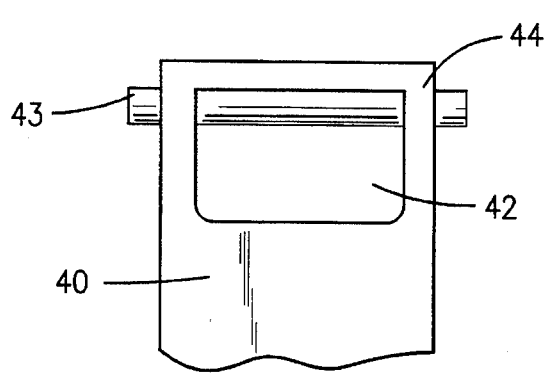
Figure 10:
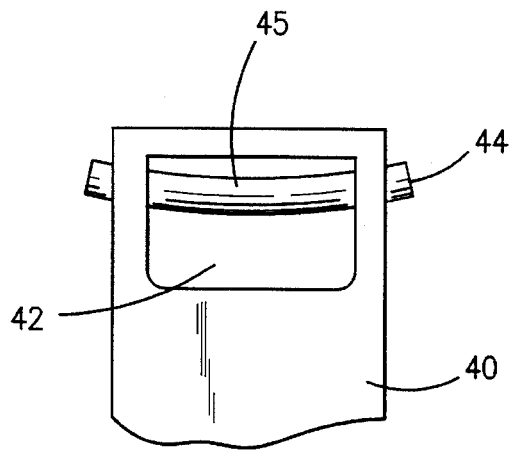
FIG. 10 is a back view of a metal watchband with a connector pin deformed to release the watchband from a watch casing.

FIGS. 9 and 10 illustrate use of the present invention with a metal watch band 40. The metal watch band has a access recess 42 formed therein, preferably formed in the underside of the band and not formed through the band. For installation of the watchband into the watch casing the connector pin 43 formed of a shape memory material, preferably a metal alloy, is inserted through an opening defined in the end of a watchband strap 44. The first end of the connector pin is inserted into a first opposing aperature of receptacle formed in the watch casing (not shown). Unidirectional radial pressure 45 is then exerted upon the center of the connector pin 43, through the access recess 42, causing the pin to flex and form an arc, reducing the distance between the connector pin ends and facilitating the insertion of the second end of the connector pin into the second aperture or receptacle in the watch casing.

Although this invention has been described in its preferred form with a certain degree of particularity with respect to a connector pin for a watch band assembly, it is understood that the present disclosure of the preferred form has been made only by way of example and that numerous changes in the details of structures and the composition of the system may be resorted to without departing from the spirit and scope of the invention.

Now that the invention has been described,
What is claimed is:

1. A wrist watch assembly, comprising:

first and second connector pins, each connector pin having a first and a second pin end, each connector pin being formed of a single piece of shape memory metal alloy;

first and second wristband straps, each of said wristband straps having a proximal end adapted for receiving a connector pin for connecting said wristband strap to a watch casing and a distal end for connecting said wristband strap to the other of said wristband straps; and a watch casing having a first and a second pair of connector pin receptacles defined therein for receiving the pin ends of said first and second connector pins, wherein said shape memory alloy has a shape memory effect which allows the alloy to return from a deformed shape to a preset shape after being heated above a transition temperature, said transition temperature being a temperature at which said shape memory alloy transforms from a martensitic state into an austenitic state.

2. The wrist watch assembly as in claim 1, wherein said connector pin consists of uniform width rod formed from said shape memory metal alloy.

3. A wrist watch assembly as in claim 2, wherein said shape memory metal alloy connector pin is at least partially plastic coated.

4. A wrist watch assembly as in claim 1, wherein said connector pin is a shape memory material having step ends of reduced diameter adapted to being received by said receptacles in said watch casing.

5. A wrist watch assembly comprising:

first and second connector pins, each connector having a first and a second pin end, each connector pin being formed of a single piece of shape memory metal alloy;

first and second wristband straps, each of said wristband straps having proximal end adapted for receiving a connector pin for connecting said wristband strap to a watch casing and a distal end for connecting said wristband strap to the other of said wristband straps; and a watch casing having a first and a second pair of connector pin receptacles defined therein for receiving the pin ends of said first and second connector pins, wherein said shape memory alloy has a shape memory effect which allows the alloy to return from a deformed shape to a preset shape after being heated above a transition temperature, said transition temperature being a temperature at which said shape memory alloy transforms from a martensitic state into an austenitic state, and wherein said connector pin is fabricated from an alloy selected from the group consisting of nickel titanium metal alloys, byrillium copper nickel alloys, silver cadmium alloys, gold cadmium alloys, copper aluminum nickel alloys, copper tin alloys copper zinc alloys, indium titanium alloys, nickel aluminum alloys, nickel titanium alloys, iron platinum alloys, molybdenum copper alloys, and iron molybdenum silicon.

6. A wrist watch assembly as in claim 1, wherein each of said pair of connector pin receptacles comprises a first and second receptacle, said first and second receptacles facing each other, and said receptacles faced far enough apart to receive and support a connector pin.

7. A wrist watch assembly as in claim 6, wherein said pairs of connector pin receptacles are defined within pairs of support arms, and wherein said support arms project from and are generally formed integrally with the watch case.

8. A wrist watch assembly as in claim 7, wherein each support arm is provided with a guide indentation located adjacent said connector pin receptacles, said indentation capable of assisting in guiding the end of the connector pin into place.

9. A wrist watch assembly, comprising:

first and second connector pins, each connector pin having a first and second pin end, each connector pin being formed of a single piece of shape memory material;

a wristband strap, said wristband strap having two ends, each of said ends adapted for receiving a connector pin for connecting said wristband strap to a watch casing; and a watch casing having a first and a second pair of connector pin receptacles defined therein for receiving the pin ends of said first and second connector pins, wherein said shape memory alloy has a shape memory effect which allows the alloy to return from a deformed shape to a preset shape after being heated above a transition temperature, said transition temperature being a temperature at which said shape memory alloy transforms from a martensitic state into an austenitic state.

10. A wrist watch assembly, comprising:

first and second connector pins, each connector pin having a first and second pin end, each connector pin being formed of a single piece of shape memory material;

a wristband strap, said wristband strap having two ends, each of said ends adapted for receiving a connector pin for connecting said wristband strap to a watch casing; and a watch casing having a first and a second pair connector pin receptacles defined therein for receiving the pin ends of said first and second connector pins, wherein said shape memory alloy has a shape memory effect which allows the alloy to return from a deformed shape to a preset shape after being heated above a transition temperature, said transition temperature being a temperature at which said shape memory alloy transforms from a martensitic state into an austenitic state and wherein said connector pin is fabricated from an alloy selected from the group consisting of nickel titanium metal alloys, byrillium copper nickel alloys, silver cadmium alloys, gold cadmium alloys, copper aluminum nickel alloys, copper tin alloys, copper zinc alloys, indium titanium alloys, nickel aluminum alloys, nickel titanium alloys, iron platinum alloys, molybdenum copper alloys, and iron molybdenum silicon.

* * * * *